United States Patent
Fischer et al.

(10) Patent No.: US 12,015,377 B2
(45) Date of Patent: *Jun. 18, 2024

(54) CABLING SYSTEMS FOR ROOFTOP PHOTOVOLTAIC SOLAR SYSTEMS

(71) Applicant: SunPower Corporation, San Jose, CA (US)

(72) Inventors: Kevin C. Fischer, Orinda, CA (US); Kristine Little, Austin, TX (US)

(73) Assignee: SunPower Corporation, San Jose, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 17/576,154

(22) Filed: Jan. 14, 2022

(65) Prior Publication Data
US 2022/0140782 A1    May 5, 2022

Related U.S. Application Data

(62) Division of application No. 16/404,226, filed on May 6, 2019, now Pat. No. 11,233,479.

(60) Provisional application No. 62/666,960, filed on May 4, 2018.

(51) Int. Cl.
| | |
|---|---|
| *H02S 20/25* | (2014.01) |
| *F16L 13/02* | (2006.01) |
| *H02S 40/12* | (2014.01) |
| *H02S 40/36* | (2014.01) |
| *E04D 13/10* | (2006.01) |
| *H02S 20/23* | (2014.01) |

(52) U.S. Cl.
CPC .............. *H02S 40/36* (2014.12); *H02S 20/25* (2014.12); *E04D 13/103* (2013.01); *F16L 13/02* (2013.01); *H02S 20/23* (2014.12); *H02S 40/12* (2014.12)

(58) Field of Classification Search
CPC .......... H02S 40/36; H02S 20/25; H02S 40/12; E04D 13/103; F16L 13/02; Y02B 10/10; Y02E 10/50; H02G 3/0437; H02G 3/30
See application file for complete search history.

(56) References Cited

U.S. PATENT DOCUMENTS

| | | | | |
|---|---|---|---|---|
| 602,901 | A | * | 4/1898 | Esselen .................... E04D 13/10 52/24 |
| 1,933,053 | A | * | 10/1933 | Glattly .................... H02G 3/123 220/3.6 |
| 2,149,818 | A | * | 3/1939 | North ........................ E04D 1/34 52/24 |

(Continued)

FOREIGN PATENT DOCUMENTS

| | | | | | |
|---|---|---|---|---|---|
| JP | 2000282650 | A | * | 10/2000 | ............. H02S 20/23 |

OTHER PUBLICATIONS

Notice of Allowance for U.S. Appl. No. 16/404,226 (Sep. 15, 2021).

(Continued)

*Primary Examiner* — Phi D A
(74) *Attorney, Agent, or Firm* — Jenkins, Taylor & Hunt, P.A.

(57) ABSTRACT

Rooftop photovoltaic solar systems and methods for installing interconnection wiring for photovoltaic solar systems. Cabling systems can include cable support stands secured underneath shingles. Cabling systems can include molded rubber raceways mounted using raceway clips secured underneath shingles.

16 Claims, 19 Drawing Sheets

(56) References Cited

U.S. PATENT DOCUMENTS

| | | | | |
|---|---|---|---|---|
| 3,021,102 | A | * | 2/1962 | Kuempel ............... E04D 13/08 248/80 |
| 3,532,225 | A | | 10/1970 | Reed |
| 3,588,012 | A | * | 6/1971 | Schaefter ............... A01G 25/02 248/80 |
| 4,636,577 | A | | 1/1987 | Peterpaul |
| 5,399,812 | A | * | 3/1995 | Woszczyna ......... B60R 16/0215 174/99 R |
| 5,664,374 | A | * | 9/1997 | Lee ....................... E04D 13/10 52/24 |
| 6,268,566 | B1 | * | 7/2001 | Takiguchi ........... B60R 16/0215 174/72 A |
| 6,361,000 | B1 | * | 3/2002 | Jette .................... H02G 3/0443 248/302 |
| 6,448,497 | B1 | * | 9/2002 | McCracken ........... H02G 3/383 174/99 R |
| 6,972,367 | B2 | * | 12/2005 | Federspiel .......... H02G 3/0437 174/68.3 |
| 7,964,804 | B2 | * | 6/2011 | Kaplan ................ H02G 3/0431 174/101 |
| 8,191,319 | B2 | | 6/2012 | Nark |
| 8,205,397 | B2 | | 6/2012 | Nark |
| 11,233,479 | B2 | | 1/2022 | Fischer et al. |
| 2001/0007341 | A1 | | 7/2001 | Jette |
| 2004/0144898 | A1 | * | 7/2004 | Spagnoli ................. H02G 3/32 248/303 |
| 2006/0096968 | A1 | | 5/2006 | Livermore |
| 2007/0157963 | A1 | * | 7/2007 | Metten ................. F24S 25/632 136/251 |
| 2008/0169018 | A1 | * | 7/2008 | Miyamoto ............ F24S 25/632 136/251 |
| 2009/0095284 | A1 | * | 4/2009 | Klotz .................. H01L 31/0547 126/704 |
| 2009/0178350 | A1 | | 7/2009 | Kalkanoglu et al. |
| 2010/0242381 | A1 | | 9/2010 | Jenkins |
| 2011/0162639 | A1 | * | 7/2011 | Jeandeaud ............ F24S 25/40 126/634 |
| 2011/0314753 | A1 | | 12/2011 | Farmer et al. |
| 2012/0085041 | A1 | * | 4/2012 | Place ..................... F24S 25/70 52/173.3 |
| 2016/0258554 | A1 | | 9/2016 | Ripoll Agullo et al. |
| 2019/0123679 | A1 | | 4/2019 | Rodrigues et al. |
| 2019/0341882 | A1 | | 11/2019 | Fischer et al. |

OTHER PUBLICATIONS

Office Action for U.S. Appl. No. 16/404,226 (Jun. 21, 2021).
Restriction Requirement for U.S. Appl. No. 16/404,226 (Mar. 2, 2021).
"Cope® Aickinstrut Cable Tray System," http://www.copecabletray.com/index.php?Page=browse_parts&Sys=Aickinstrut&subsyst=Channel, pp. 1-5 (Copyright 2019).
"Metallic—Aluminum," T&B Cable Tray, Thomas & Betts, 80 pages (Mar. 16, 2018).
"Aluminum H-beam cable tray," https://www.tessco.com/products/displayProductInfo.do?sku=585692&eventGroup=4&eventPage=1, pp. ___ (Copyright ___), Mar. 9, 2018.
"Panel Duct/Wiring Duct/Finger Duct," https://www.mayerelectric.com/15940/Category/Panel-Duct-/-Wiring-Duct-/-Finger-Duct, pp. 1-6 (Copyright 2016).

* cited by examiner

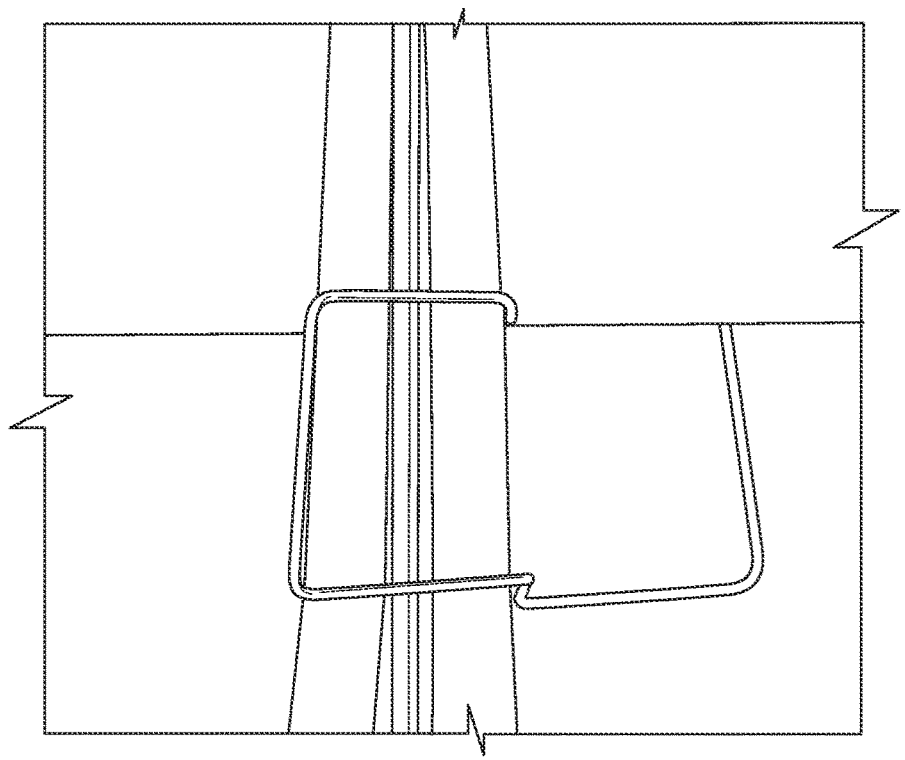
FIG. 7A
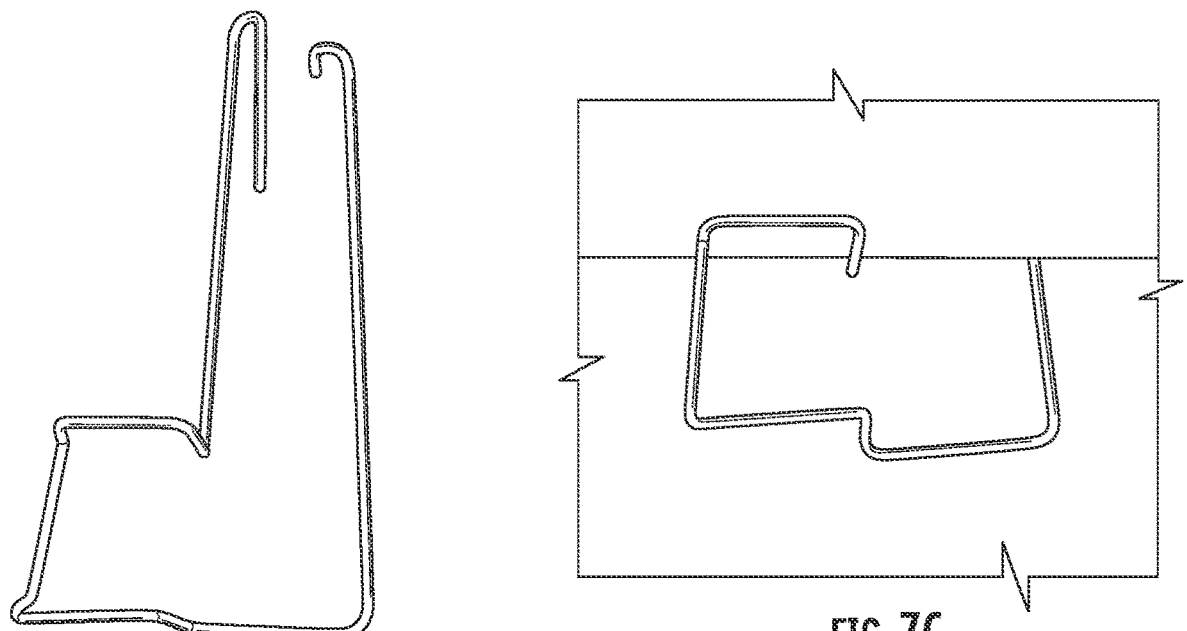
FIG. 7B
FIG. 7C

CABLING SYSTEMS FOR ROOFTOP PHOTOVOLTAIC SOLAR SYSTEMS

PRIORITY CLAIM

This application is a divisional of U.S. patent application Ser. No. 16/404,226, filed May 6, 2019, which claimed the benefit of U.S. Provisional Patent Application Ser. No. 62/666,960, filed May 4, 2018, the disclosure of which is incorporated herein by reference in its entirety.

TECHNICAL FIELD

The subject matter described in this specification relates generally to photovoltaic solar systems and in particular to cabling systems for rooftop photovoltaic solar systems.

BACKGROUND

Photovoltaic cells are devices for converting solar radiation into electrical energy. Photovoltaic cells can be assembled into solar modules, which may be used to convert sunlight into electricity. A photovoltaic solar system typically includes multiple solar modules, one or more inverters, and interconnection wiring.

The electricity produced by the solar modules may be carried by cables to electrical components of the photovoltaic solar system, e.g., one or more inverters, which can create substantial cabling needs. For example, each of the solar modules in an installation can connect to a neighboring module, until a chain of solar modules is connected to a component such as a combining device or an inverter. The cabling of the solar energy system requires proper positioning for isolation from external structures, e.g., the roof, and loose, dangling, or slack wiring can be hazardous. The cable mounting materials and mounting time may account for a significant fraction of the cost of installing the solar energy system.

SUMMARY

This specification describes rooftop photovoltaic solar systems and methods for installing interconnection wiring for photovoltaic solar systems. Cabling systems can include cable support stands secured underneath shingles. Cabling systems can include molded rubber raceways mounted using raceway clips secured underneath shingles.

BRIEF DESCRIPTION OF THE DRAWINGS

FIGS. 7A-C illustrate an example vertical run of an inverted-T raceway.

DETAILED DESCRIPTION

Figure 1:
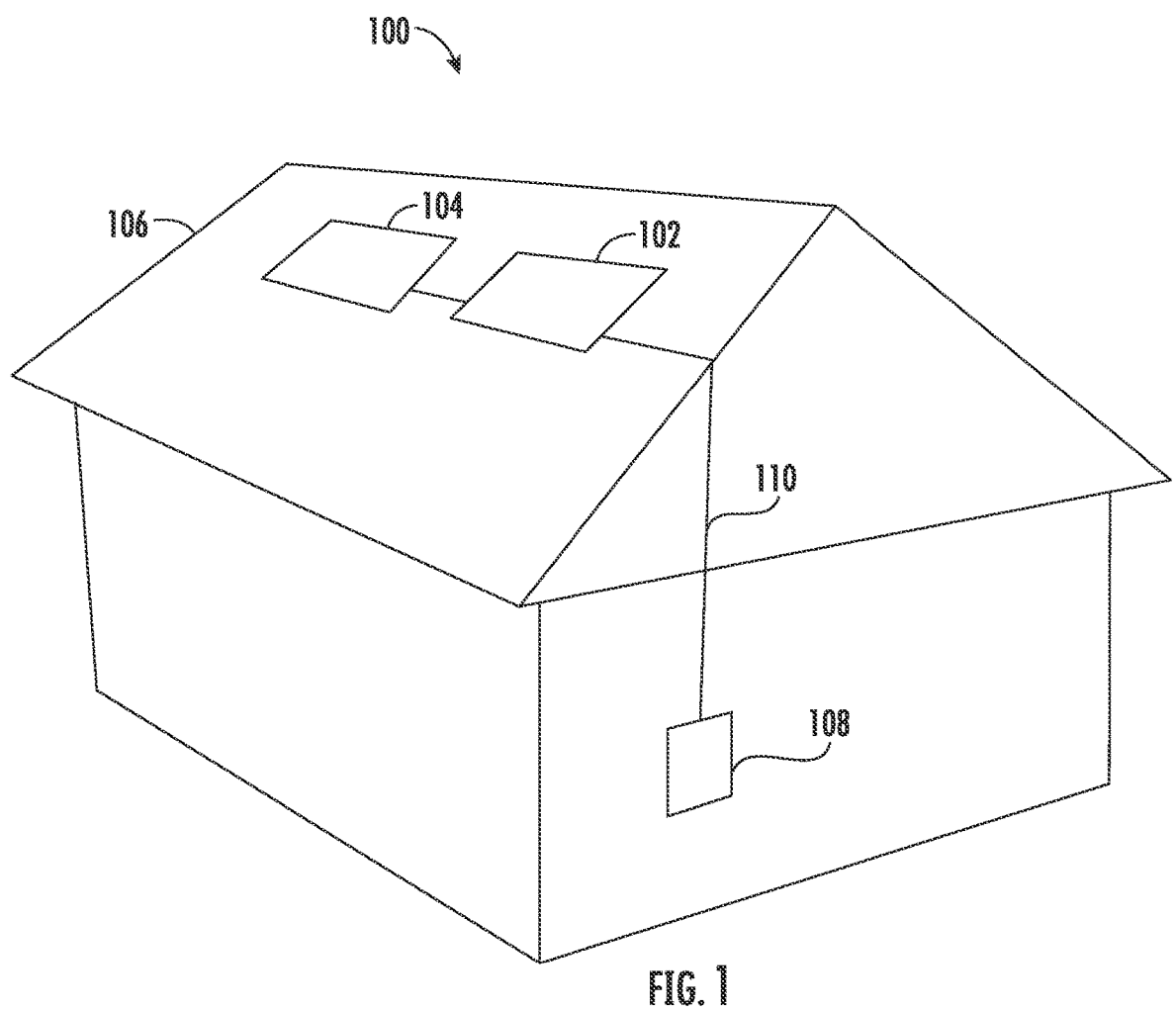
FIG. 1 illustrates an example photovoltaic solar system.

FIG. 1 illustrates an example photovoltaic solar system 100. The system 100 includes a number of photovoltaic solar modules 102 and 104 mounted on a roof 106 of a building. Each of the photovoltaic solar modules 102 and 104 is comprised of one or more photovoltaic cells, e.g., arranged in a frame. The photovoltaic solar modules 102 and 104 are chained together and electrically coupled to one or more electric components 108 by interconnection wiring 110. The electric components 108 can include, e.g., an inverter or an electric panel or both. The interconnection wiring 110 includes a number of cables to carry electricity from the photovoltaic solar modules 102 and 104 to the electric components 108.

The roof 106 is a shingled roof, e.g., comprised of generally flat, rectangular shingles laid in courses across a roof deck. Typically, each successive course of shingles overlaps the course below. The shingles can be formed of any appropriate material, e.g., asphalt, wood, or stone. The shingles are secured to the roof 106 using, e.g., nails or adhesive or both. The interconnection wiring 110 can be supported by cable support stands secured underneath shingles. Cable support stands can support cables directly or by supporting a raceway that carries the cables.

Figure 2A:
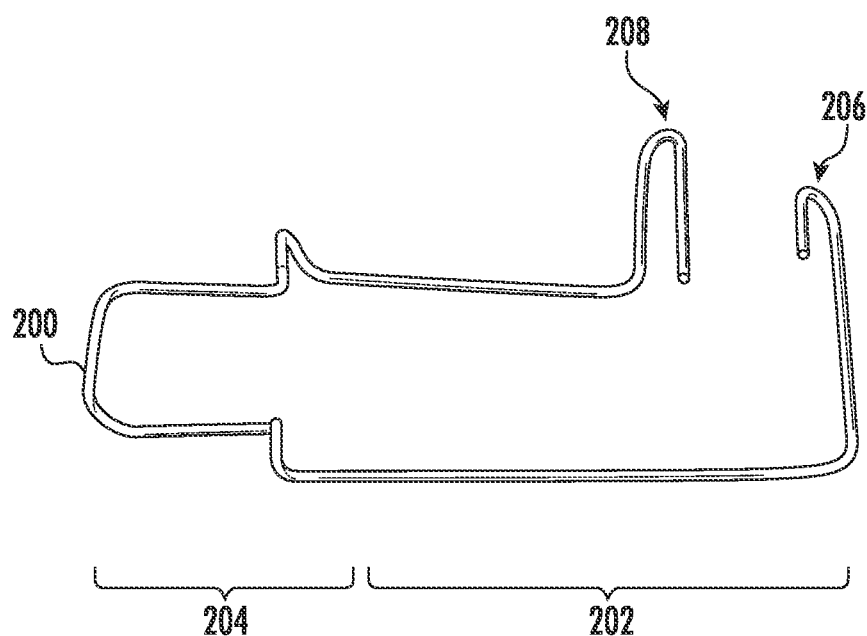
FIG. 2A shows an example cable support stand.

FIG. 2A shows an example cable support stand 200. The cable support stand 200 includes a lower portion 202 and a protruding portion 204. The cable support stand 200 can be formed from any appropriate material, e.g., from a continuous strand of spring steel bent into the lower portion 202 and the protruding portion 204.

The lower portion 202 can be perpendicular to the protruding portion 204, e.g., where the spring steel is bent to about a 90° angle at a joint between the lower portion 202 and the protruding portion 204. The lower portion 202 of the cable support stand 200 can optionally include tabs 206 and 208, which can be used for securing the cable support stand 200 to the roof by nailing. In some examples, the cable support stand is sized such that the protruding portion protrudes at least a threshold distance from the roof. If the cables are suspended over the roof by at least ⅞ of an inch (2.22 cm), then the cables can avoid an ampacity derate required by certain electrical codes.

Figure 2B:
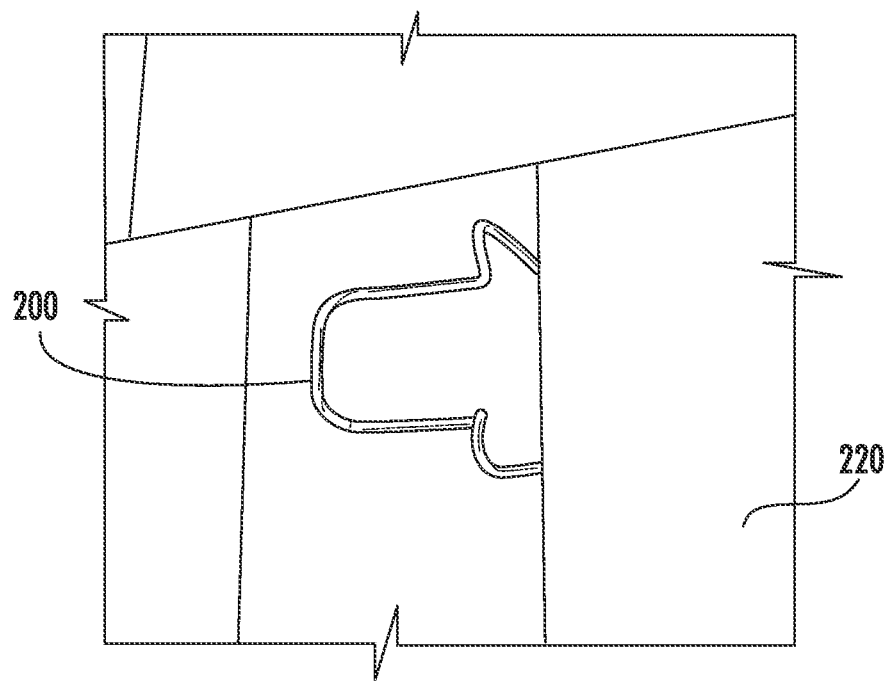
FIG. 2B shows an example installation of the cable support stand.

FIG. 2B shows an example installation of the cable support stand 200. The lower portion 202 of the cable support stand is secured under a shingle 220 of the roof, such that the protruding portion 204 of the cable support stand 200 protrudes away from the roof. For example, the single 220 may be secured to the roof using a heat-sensitive adhesive. Securing the lower portion 202 under the shingle 220 during installation can include lifting the shingle 220, e.g., using a shingle-ripper, inserting the lower portion 202 under the shingle, and re-securing the single 220 to the roof by allowing the heat-sensitive adhesive to cure from ambient heat. In some cases, the cable support stand 200 can be secured to the roof in this manner without performing any nailing.

Figure 3A:
FIG. 3A shows another example cable support stand.
Figure 3B:
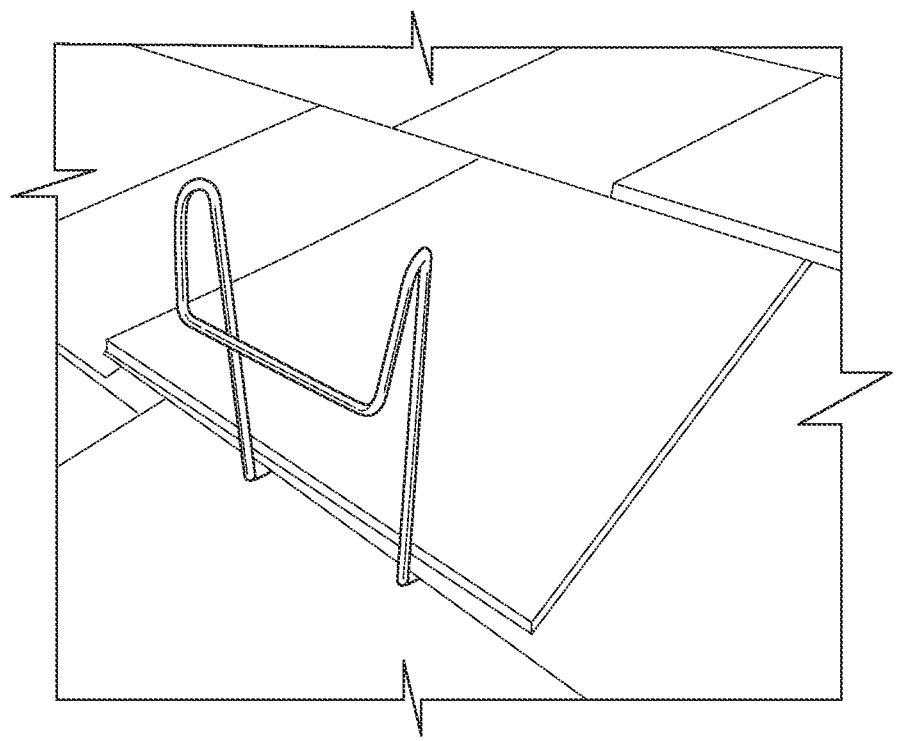
FIG. 3B shows the cable support stand secured under a shingle.

FIG. 3A shows another example cable support stand. FIG. 3B shows the cable support stand secured under a shingle.

Figure 4A:
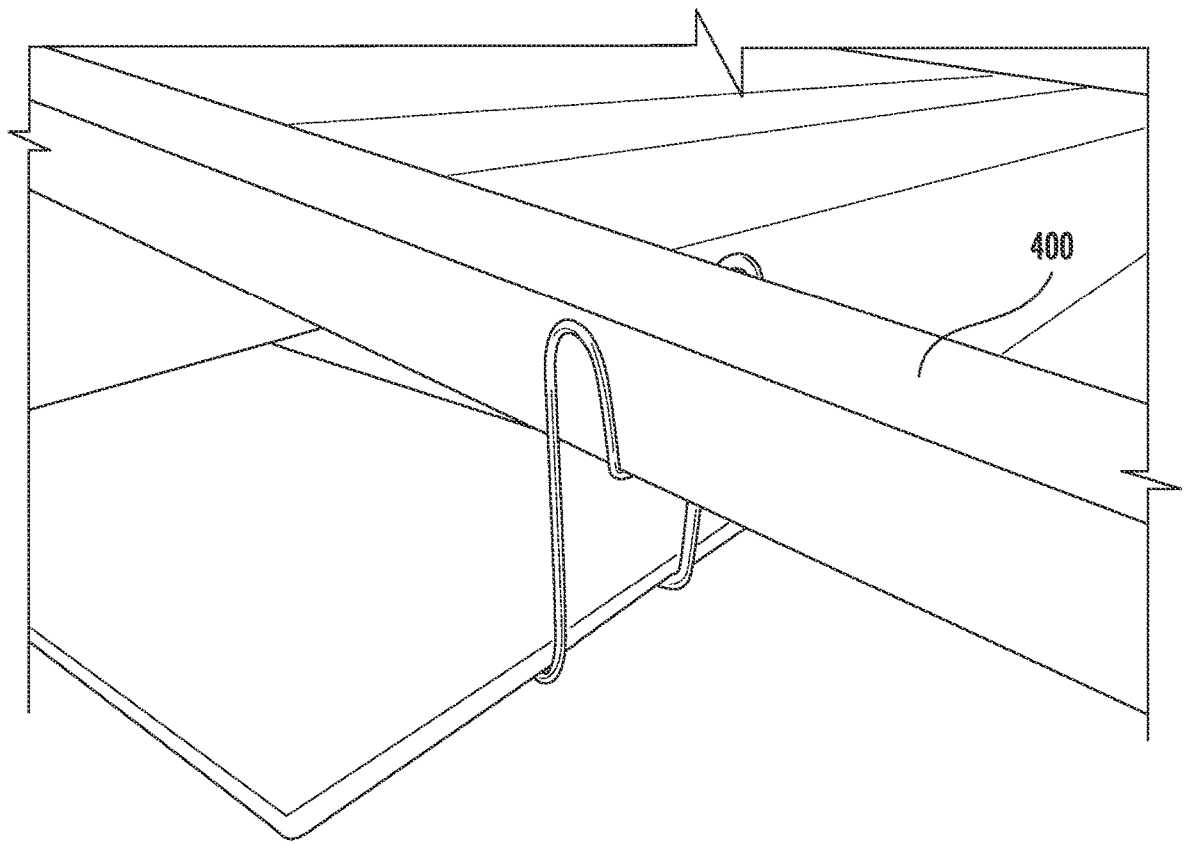
FIG. 4A shows an example cable support stand supporting an example raceway.

FIG. 4A shows an example cable support stand supporting an example raceway 400. The cable support stand supports the raceway and holds the raceway on its sides. In some cases, the raceway can be held by a clip of a zip tie, which can be used to restrain cables too. The cable support stand is secured under a shingle. In some examples, the cable support stand is sized such that the protruding portion protrudes at least a threshold distance from the roof, e.g., ⅞ of an inch (2.22 cm), resulting in the raceway 400 holding the cables at least a threshold distance from the roof.

Figure 4B:
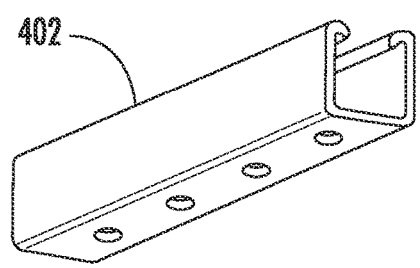
FIG. 4B shows an example of a raceway 402 made from fiberglass.

The raceway 400 can be formed of any appropriate material. For example, the raceway can be formed from a non-conducting material. FIG. 4B shows an example of a raceway 402 made from fiberglass. The raceway 402 includes a trough for securing the cables routed through the raceway 402.

Figure 5A:
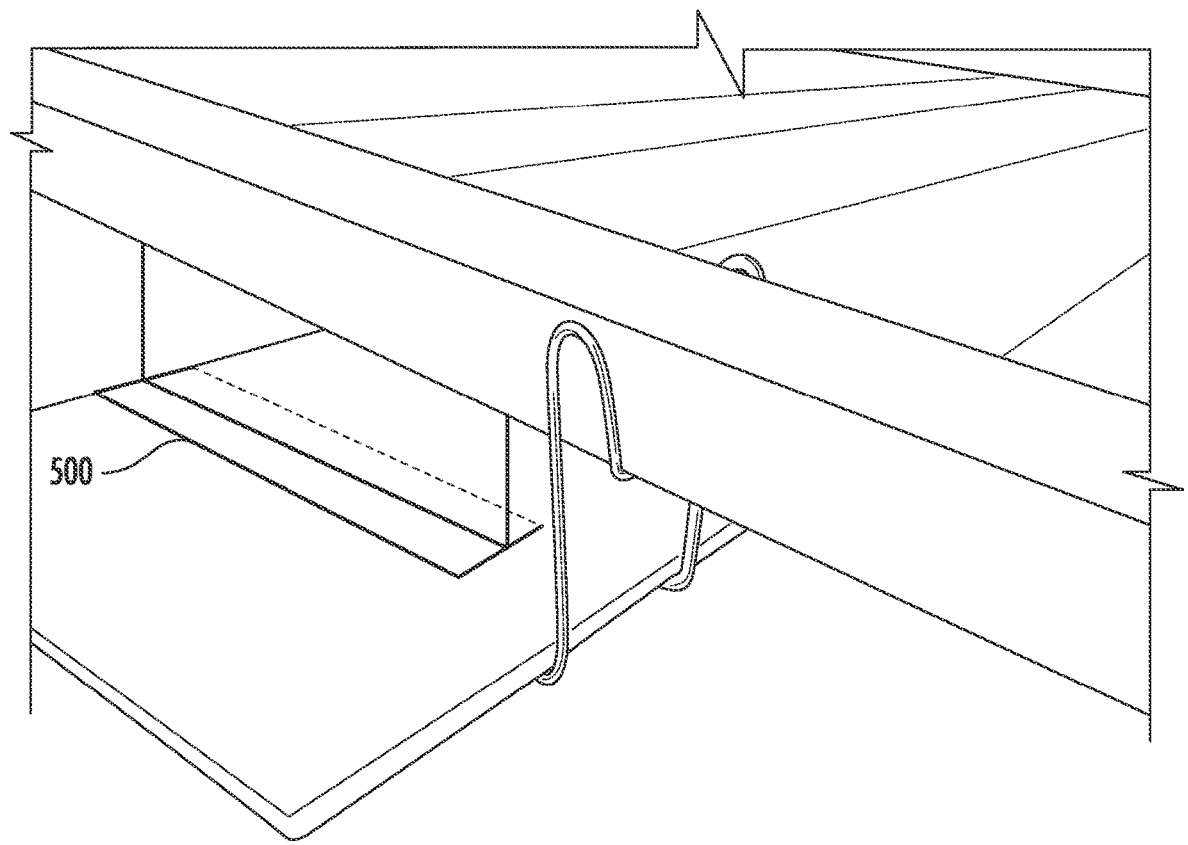
FIG. 5A shows an example raceway supported by a stand-off.
Figure 5B:
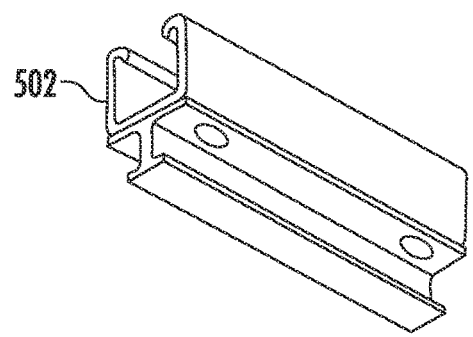
FIG. 5B shows an example of a raceway section 502 including a stand-off.

FIG. 5A shows an example raceway supported by a stand-off or support feature 500, e.g., a polymeric, metallic or concrete anchor. In some examples, the raceway is formed from a number of raceway sections, and some or all of the raceway sections can include the stand-off 500. FIG. 5B shows an example of a raceway section 502 including a stand-off to provide additional support for the weight of the raceway.

Figure 6A:
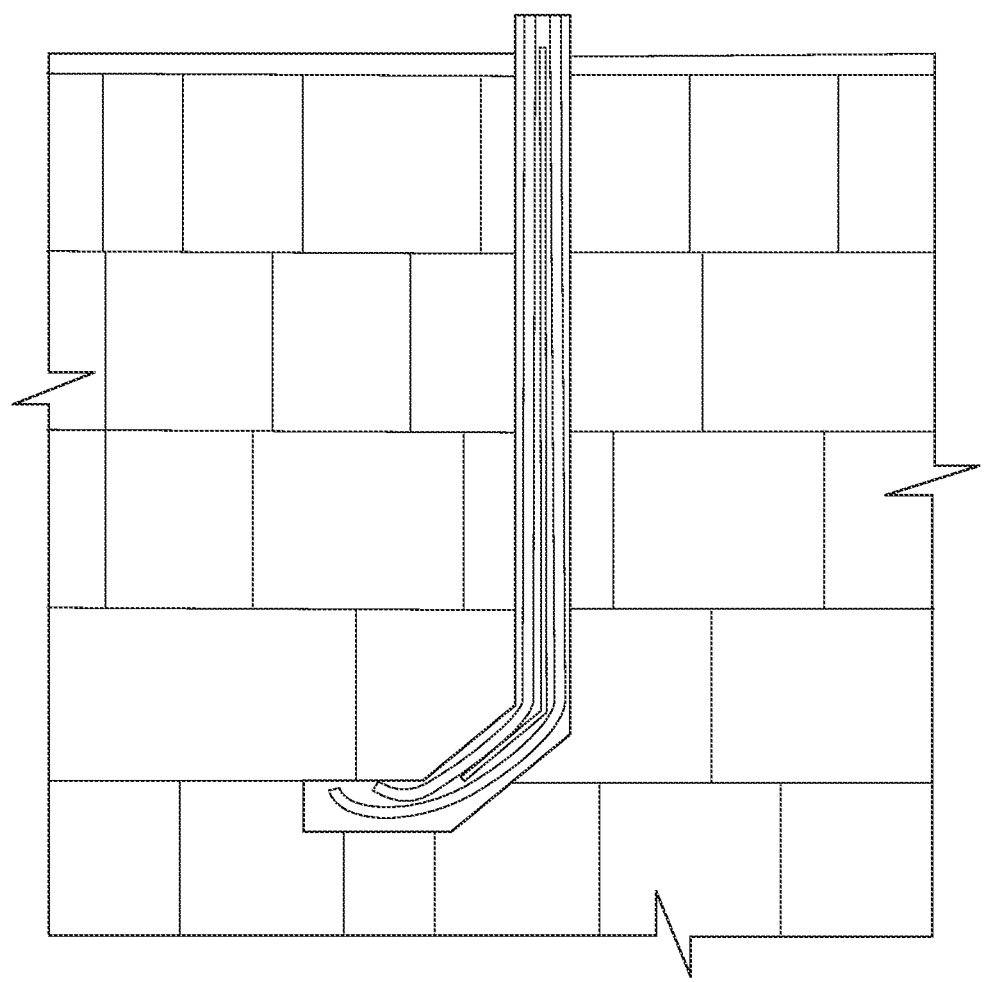
FIG. 6A shows an example raceway on a roof that is configured to protect cables from abrasion in vertical and diagonal runs.
Figure 6B:
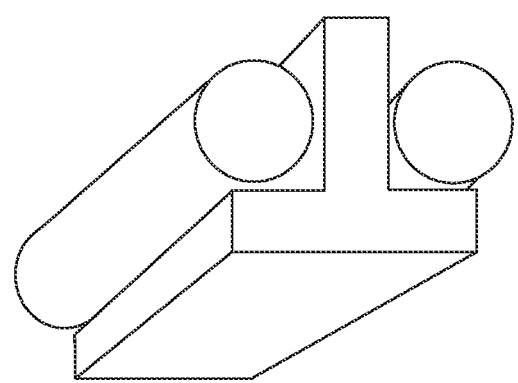
FIG. 6B shows the raceway formed as an inverted-T with a central rib separating two cables.

FIG. 6A shows an example raceway on a roof that is configured to protect cables from abrasion in vertical and diagonal runs. FIG. 6B shows the raceway formed as an inverted-T with a central rib separating two cables. Using the inverted-T raceway, the raceway can be laid directly on the roof, although this may require an ampacity derate for the cables due to the proximity to the roof.

FIGS. 7A-C illustrate an example vertical run of an inverted-T raceway. FIG. 7A shows the raceway running vertically across the roof. FIG. 7B shows an example of a raceway clip that can be secured under a shingle and used to secure the inverted-T raceway to the roof. FIG. 7C shows the raceway clip secured under a shingle.

Figure 8A:
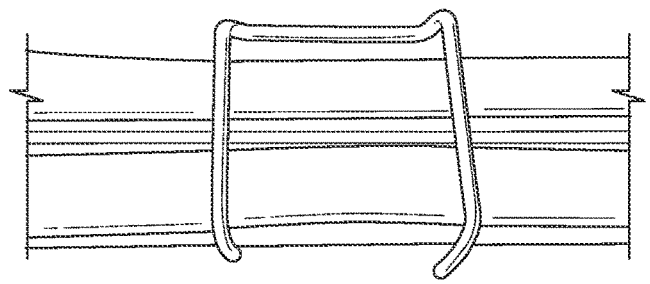
FIGS. 8A-C illustrate an example horizontal run of an inverted-T raceway.
Figure 8B:
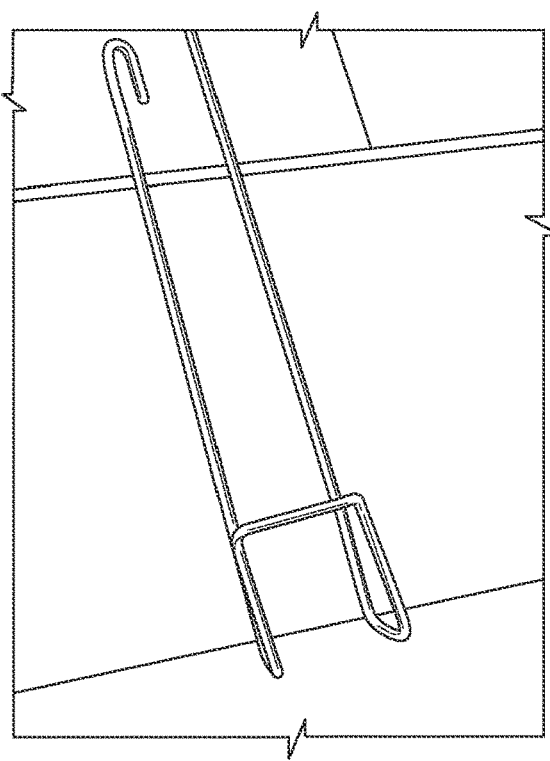
Figure 8C:
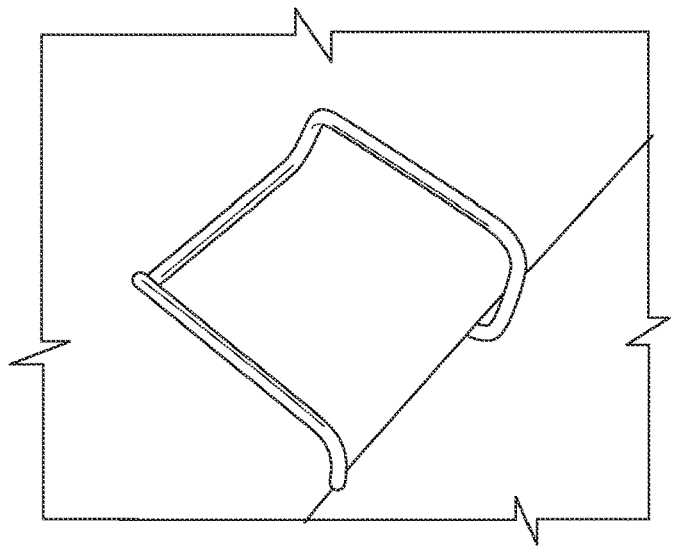

FIGS. 8A-C illustrate an example horizontal run of an inverted-T raceway. FIG. 8A shows the raceway running horizontally across the roof. FIG. 8B shows an example of a raceway clip that can be secured under a shingle and used to secure the inverted-T raceway to the roof. FIG. 8C shows the raceway clip secured under a shingle.

Figure 9A:
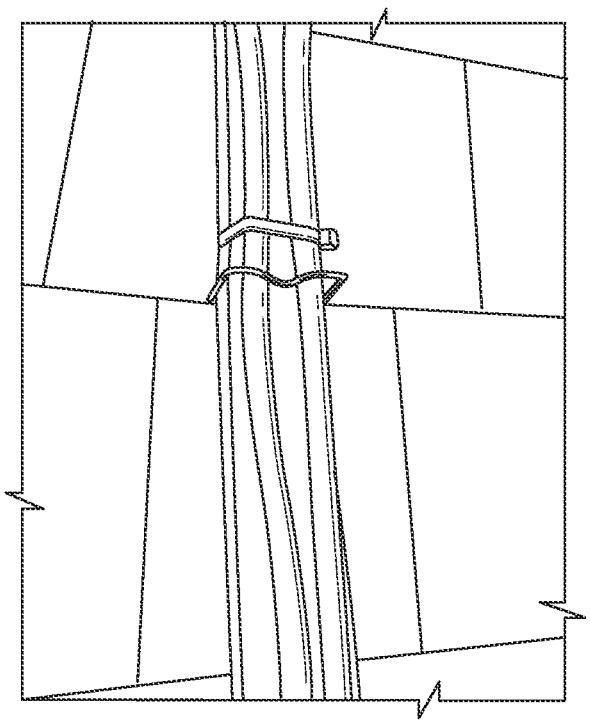
FIGS. 9A-B illustrate an example molded rubber raceway that can be used for routing cables across a roof and eaves.
Figure 9B:
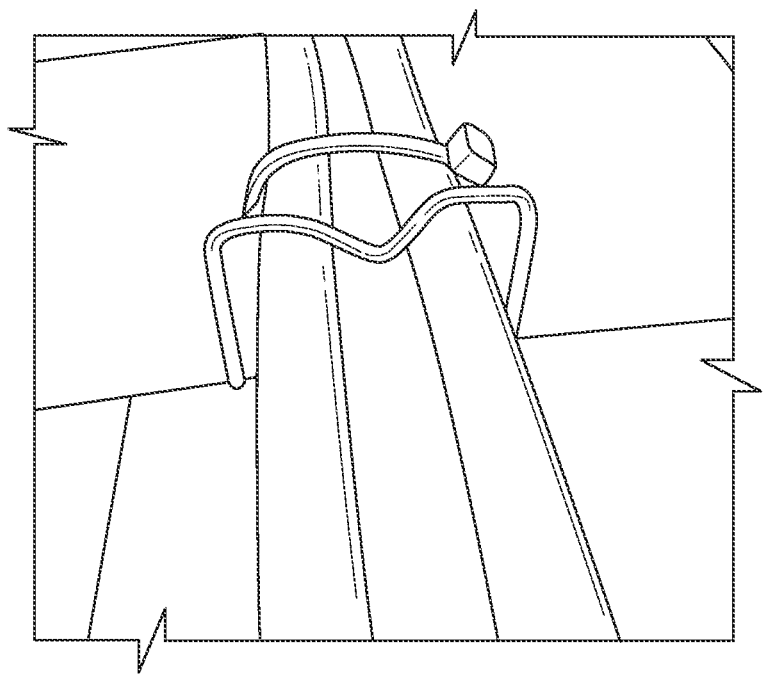

FIGS. 9A-B illustrate an example molded rubber raceway that can be used for routing cables across a roof and eaves. The molded rubber raceway can be formed from recycled rubber to protect cables from abrasion. The molded rubber raceway can be secured to the roof using a raceway clip secured underneath a shingle.

Figure 10A:
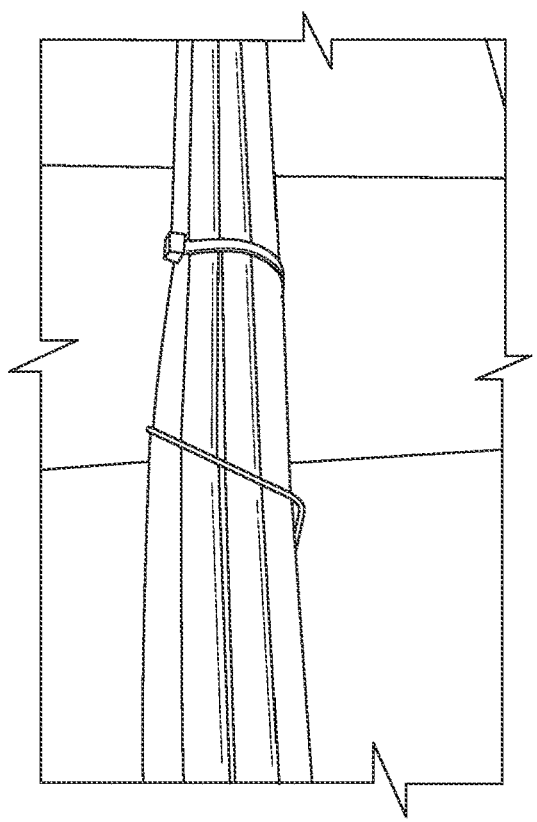
FIGS. 10A-C illustrate an example molded rubber raceway secured with a raceway clip that allows both horizontal and vertical routing with a single part.
Figure 10B:
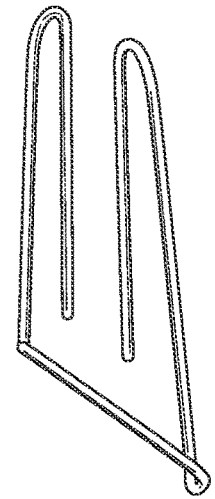
Figure 10C:
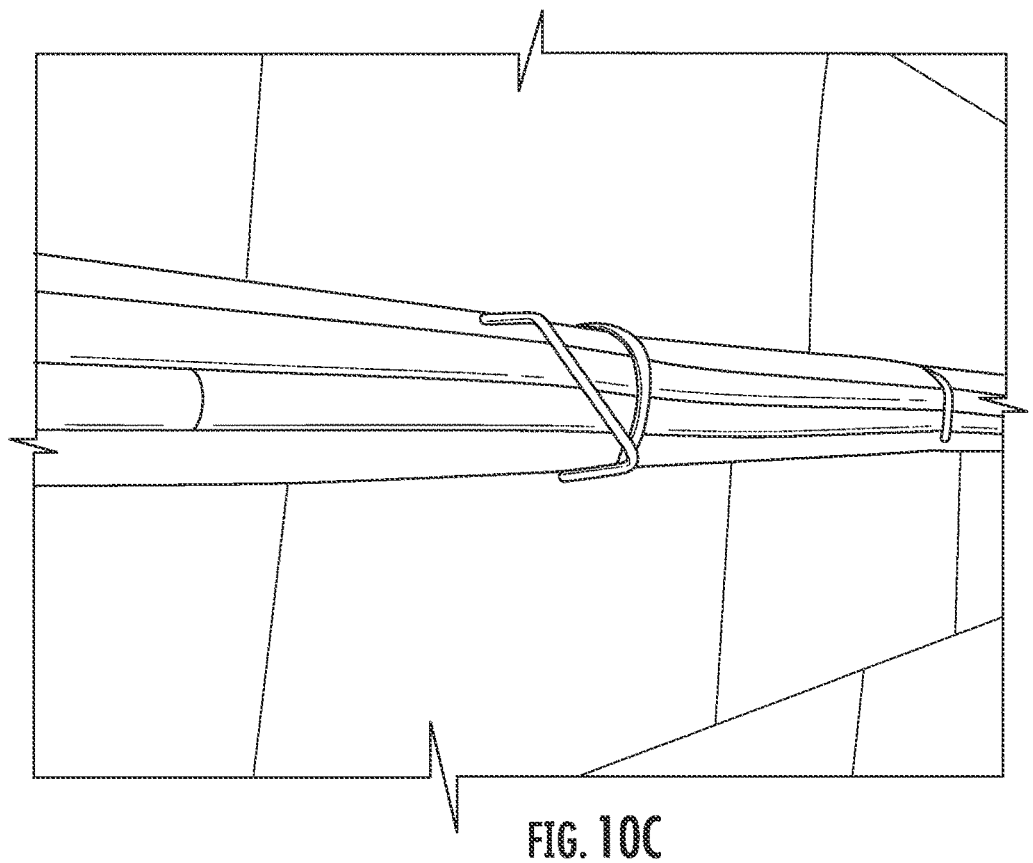

FIGS. 10A-C illustrate an example molded rubber raceway secured with a raceway clip that allows both horizontal and vertical routing with a single part. FIG. 10A shows the molded rubber raceway secured with the raceway clip in an example vertical run. FIG. 10B shows a view of the molded rubber raceway secured with the raceway clip in an example horizontal run. FIG. 10C shows a diagonal design for the raceway clip. The raceway clip includes a lower portion that, during installation, goes under a shingle, and a protruding portion that extends diagonally with respect to the lower portion.

Figure 11:
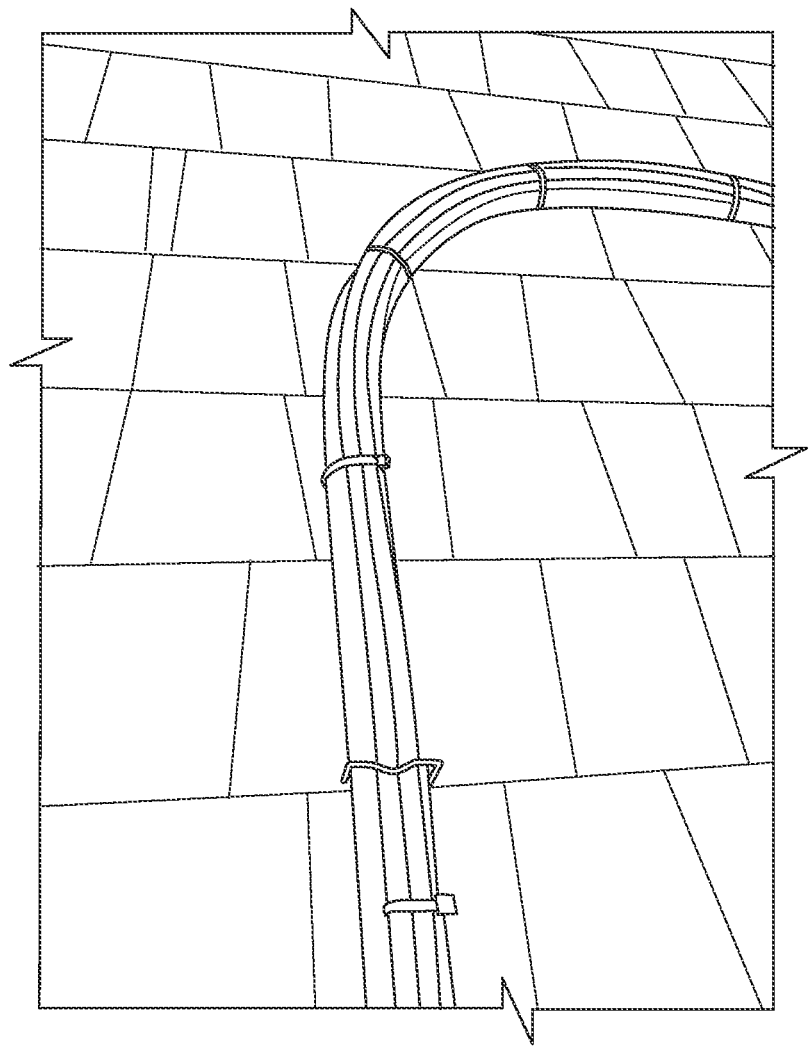
FIG. 11 shows an example molded rubber raceway being routed horizontally and vertically.

FIG. 11 shows an example molded rubber raceway being routed horizontally and vertically. Since the molded rubber raceway is flexible, the molded rubber raceway can be routed between a horizontal run and a vertical run with a clean radius bend. The molded rubber raceway is flexible enough to go over ridgelines and valleys.

Figure 12A:
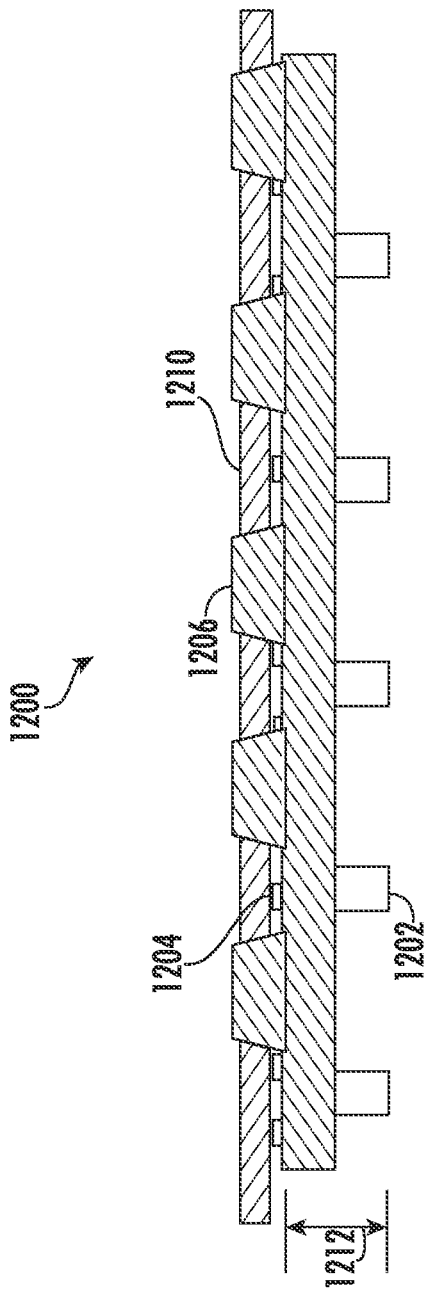
FIGS. 12A-E illustrate example molded rubber raceways.
Figure 12B:
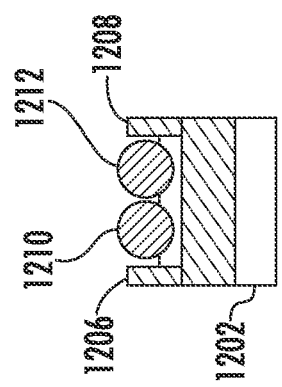

FIGS. 12A-E illustrate example molded rubber raceways. FIG. 12A shows a side view of an example raceway 1200, and FIG. 12B shows a cross-sectional view of the raceway 1200. The raceway 1200 includes a number lower ribs 1202 and a number of upper ribs 1204. When installed, the lower ribs 1202 elevate the raceway 1200 from the roof, and the upper ribs 1204 elevate the cables 1219 and 1212 from the raceway 1200.

The lower ribs 1202 can allow water and air to move underneath the raceway 1200, and the upper ribs 1204 can allow water and air to move over the raceway 1200. The raceway 1200 can be configured, e.g., by selecting appropriate heights of the lower and upper ribs 1204 and 1206, so that cables 1210 and 1212 are elevated by at least a threshold height 1212 from the roof, e.g., at least ⅞ of an inch (2.22 cm).

The raceway 1200 can include a pair of sidewalls 1206 and 1208 on opposite sides of the raceway 1200. The cables 1210 and 1212 can be placed within the sidewalls 1206 and 1208.

The raceway 1200 may be formed from any appropriate molded rubber material, e.g., recycled rubber material from recycled automobile tires, which can be a low-cost and weather-resistant material. In some examples, one or more portions of the raceway 1200 may be formed from a recycled styrene-butadiene rubber material. A source of such material may be, for example, recycled automobile tires that are shredded and bonded to form the structures described above. The recycled rubber may be formed into molded rubber raceways and molded rubber raceway sections using a compression molding process. The compression molding process may include binding the ground up rubber material in a polyurethane matrix.

Figure 12C:
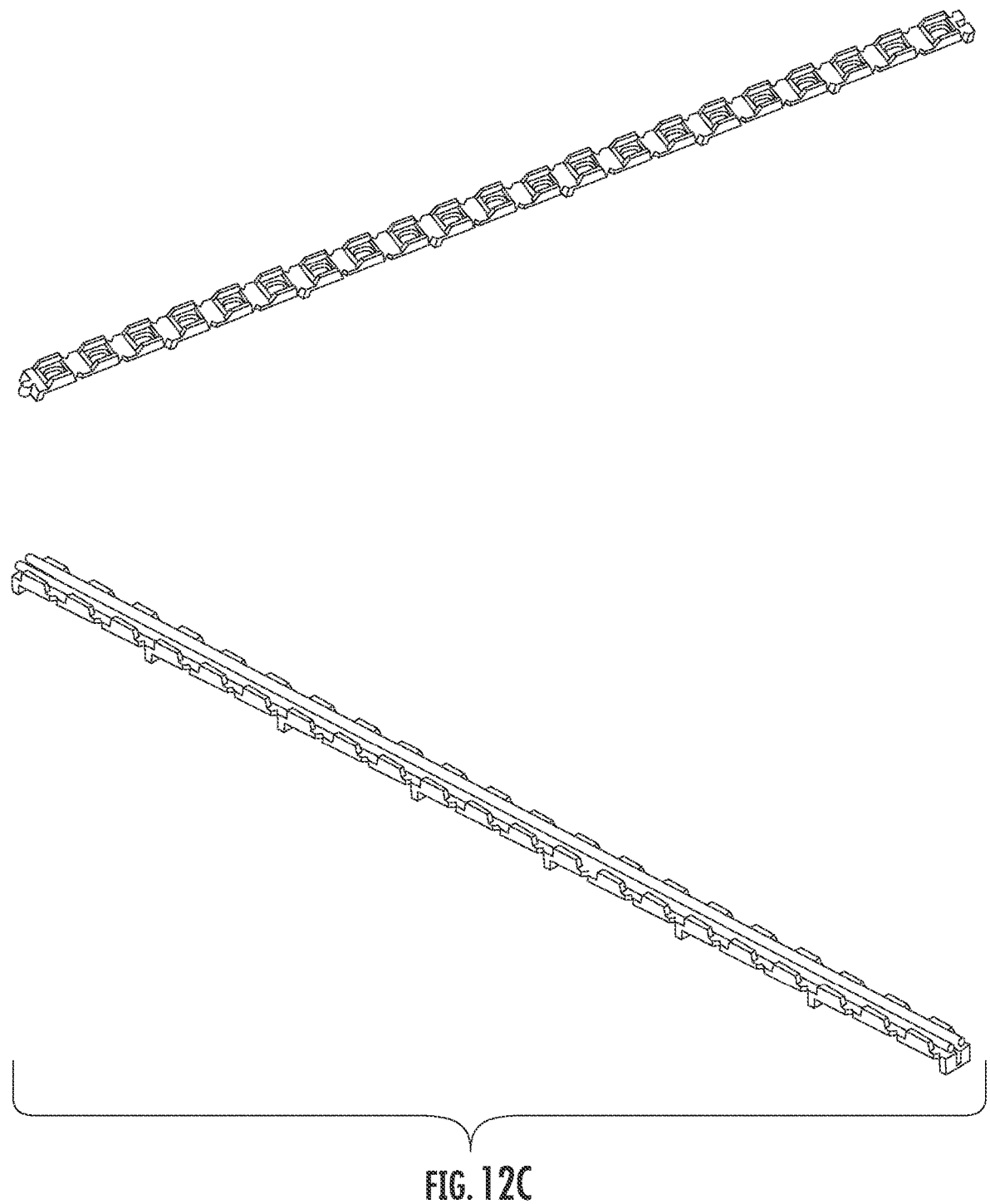
Figure 12D:
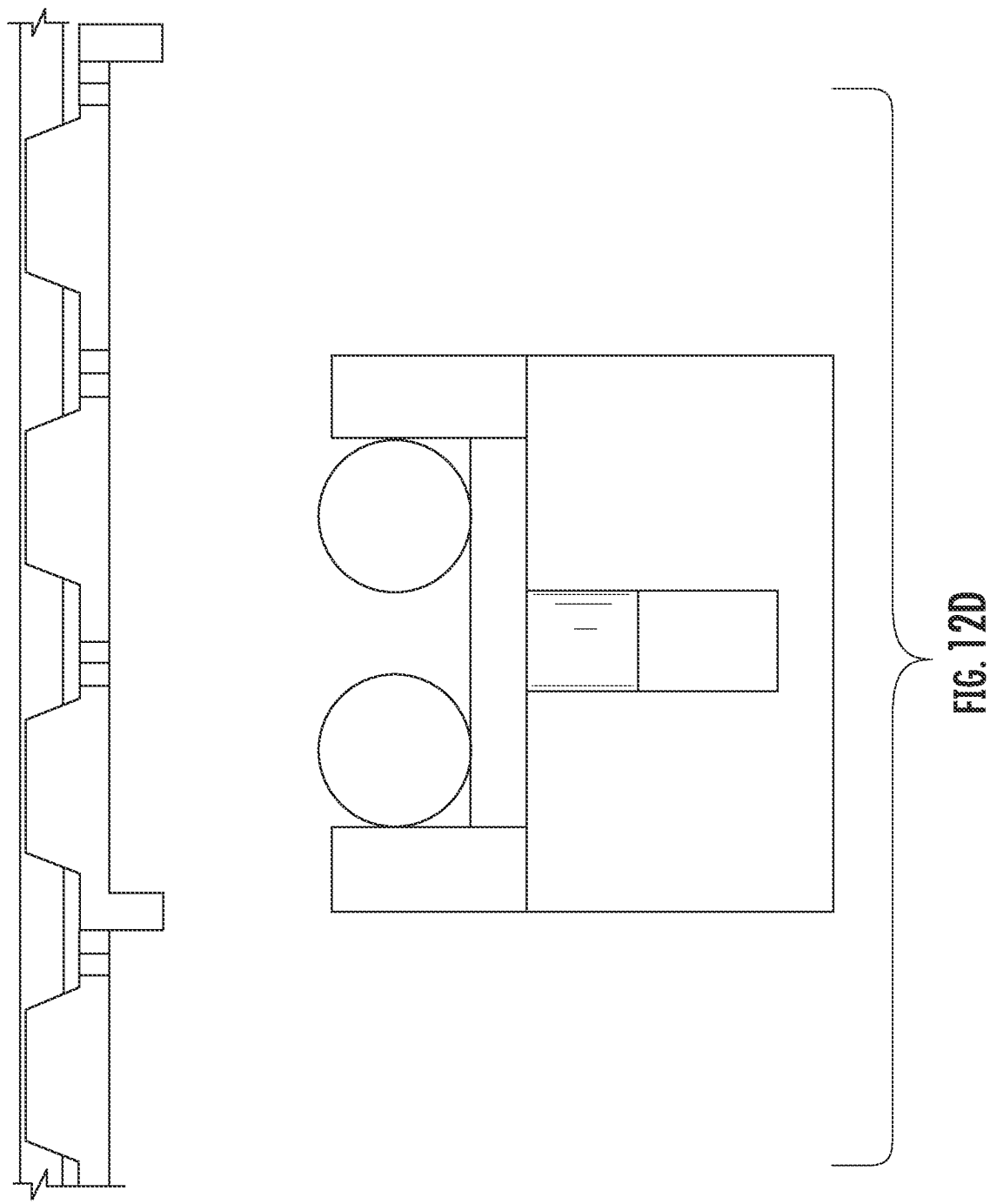
Figure 12E:
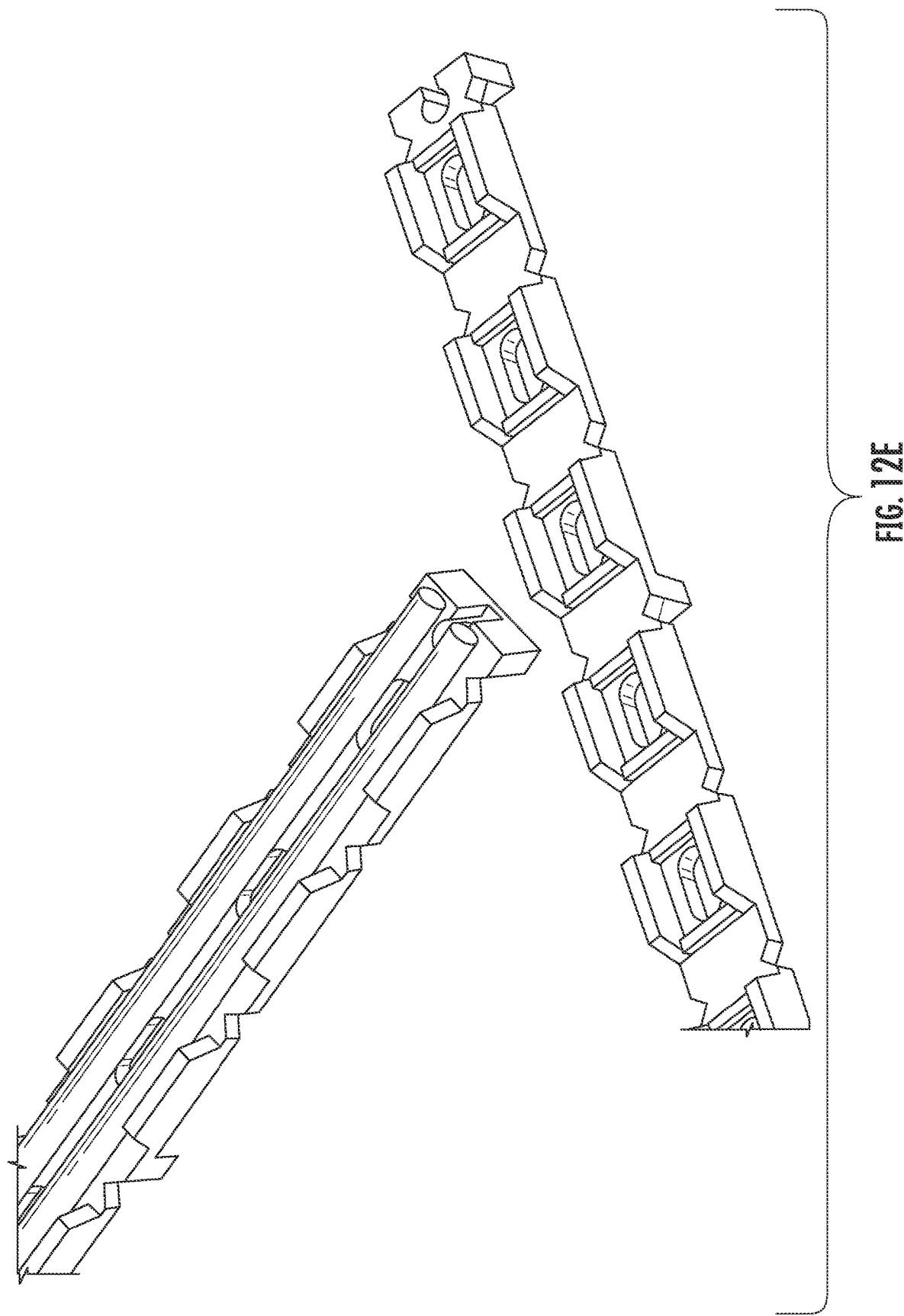
Figure 13A:
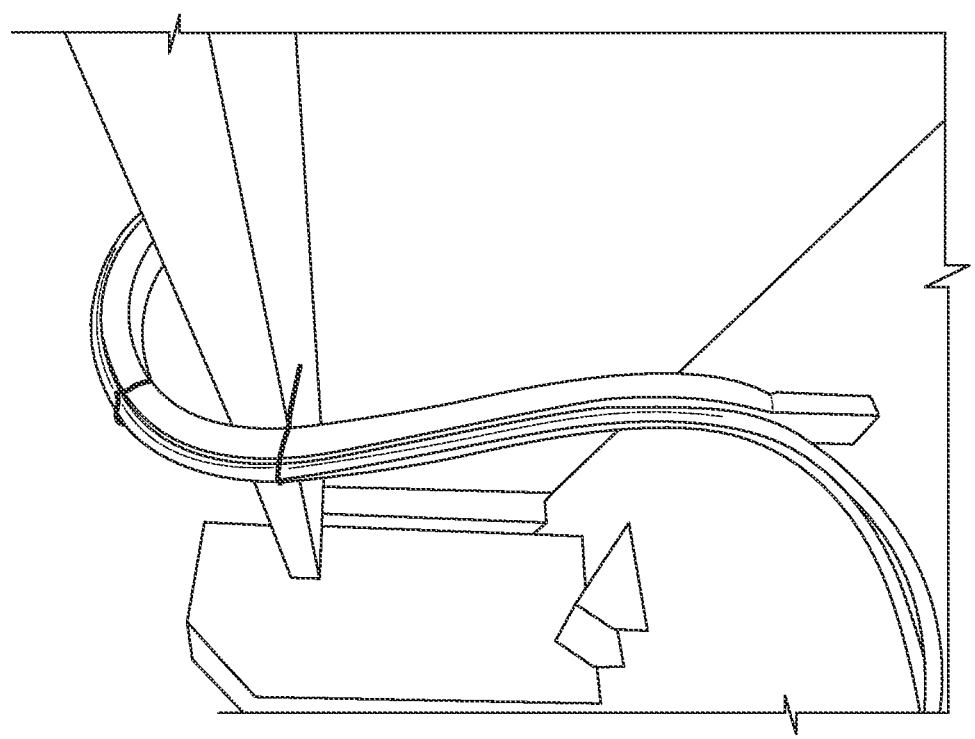
FIGS. 13A-D show examples of molded rubber raceways in use for over-eave routing.
Figure 13B:
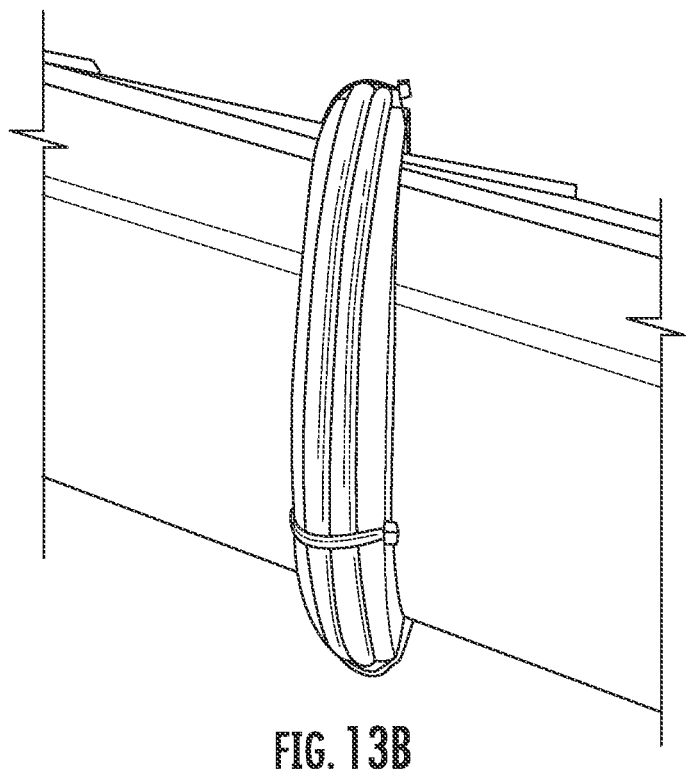
Figure 13C:
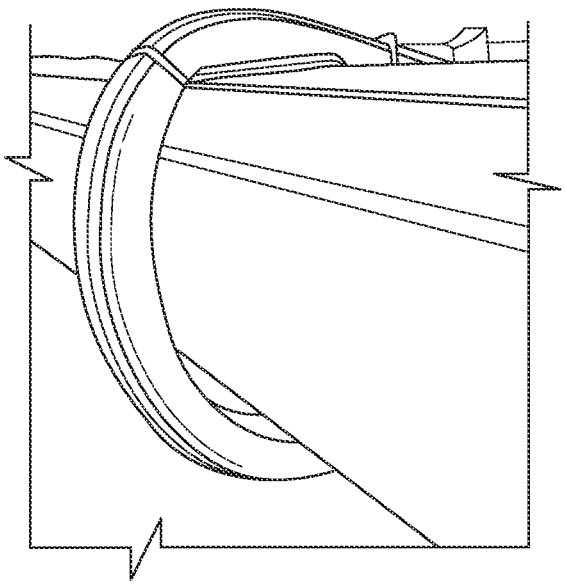
Figure 13D:
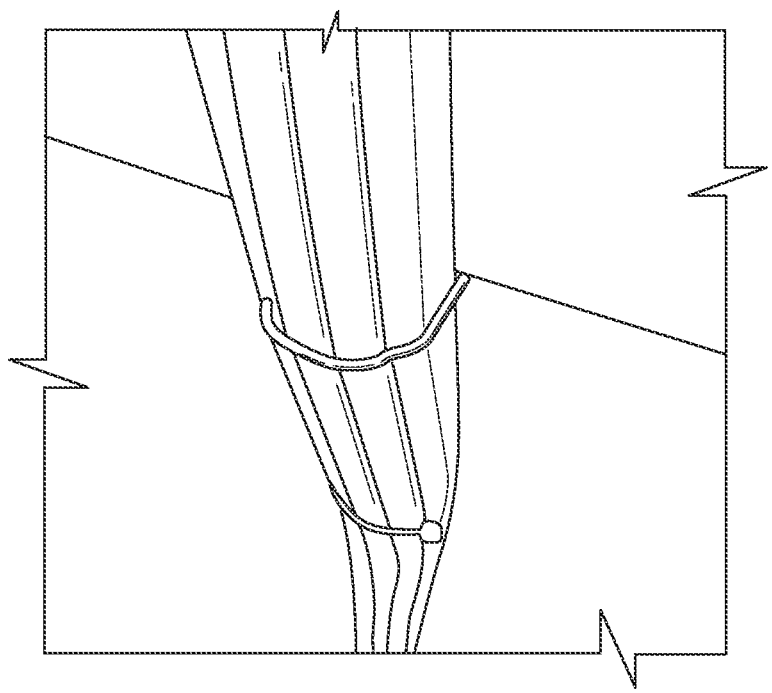
Figure 14A:
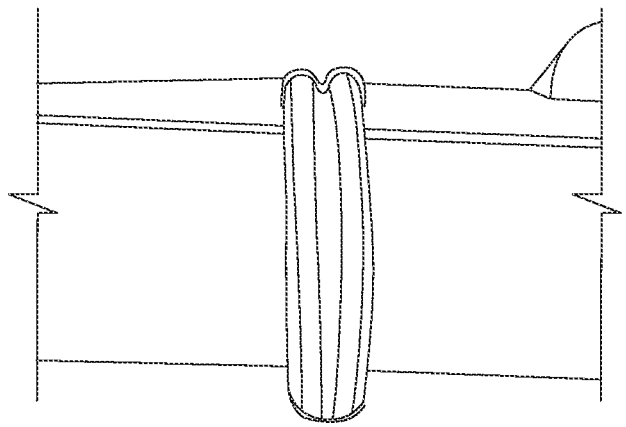
FIGS. 14A-D show examples of molded rubber raceways in use for over-gutter routing.
Figure 14B:
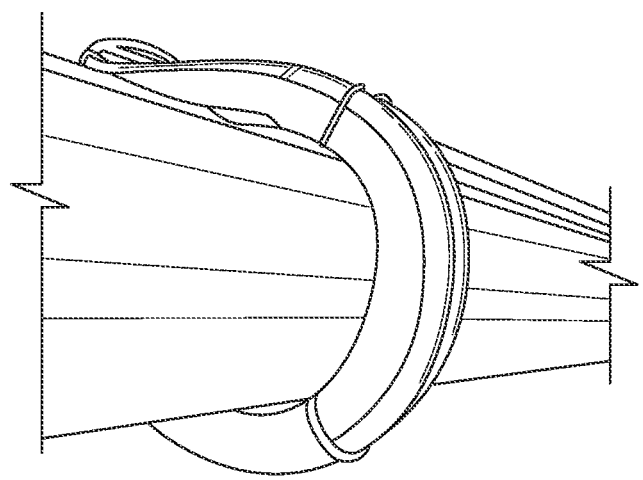
Figure 14C:
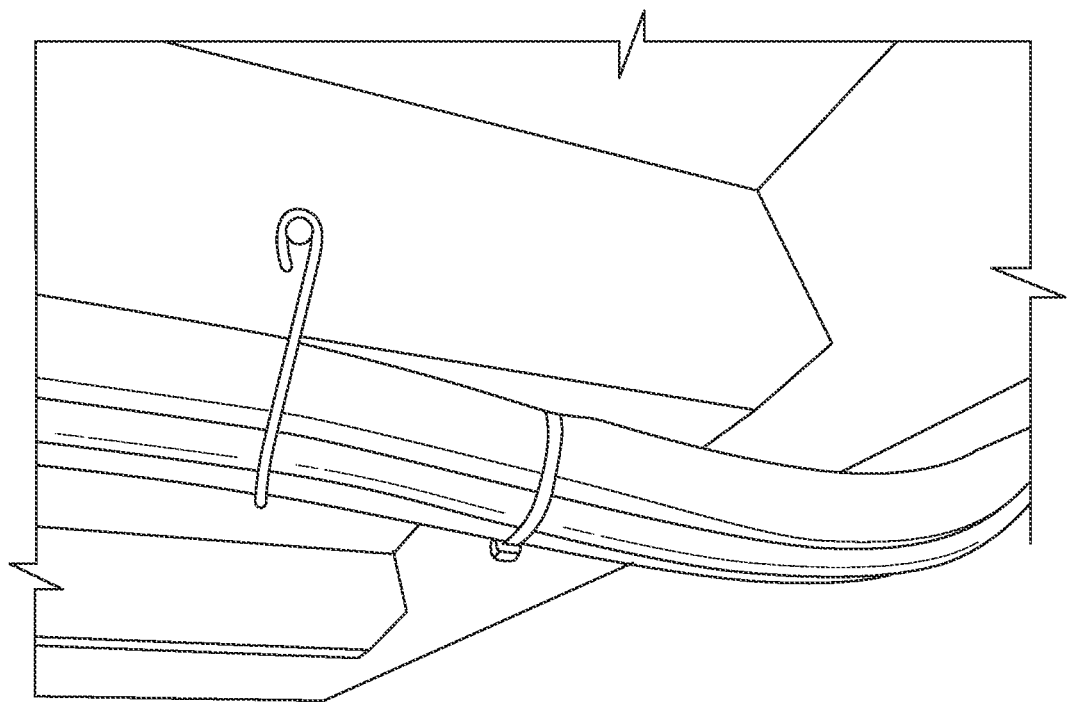
Figure 14D:
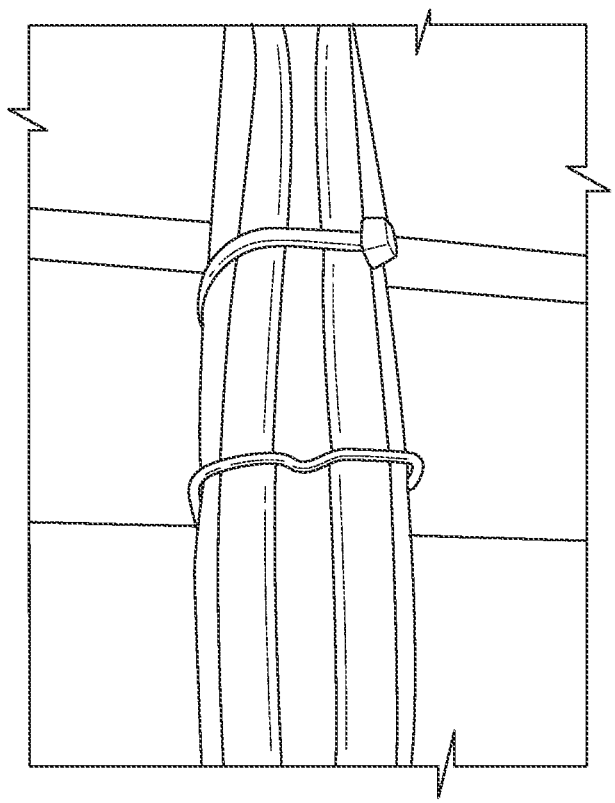

FIGS. 12C-E show other example molded rubber raceways. The molded rubber raceways can be constructed from separate raceway sections. Mounting a molded rubber raceway on a roof can include joining raceway sections end-to-end. For example, the raceway sections can be joined using interlocking features, e.g., a hook on one end and an eye on the other end. An interlocking feature can allow the end of one raceway section to engage and interconnect with a matching end of an adjacent raceway section.

FIGS. 13A-D show examples of molded rubber raceways in use for over-eave routing. The raceways provide protection for cables from edges of the roof and eaves. The raceways are flexible and bendable to go around eaves, while the bend radius can prevent over-bending. The raceways can follow contours of eaves. Raceway clips can support the raceways and cables from under eaves, and cables can transition down walls from the raceway.

FIGS. 14A-D show examples of molded rubber raceways in use for over-gutter routing. The raceways provide protection for cables from edges of the roof and gutters. The raceways are flexible and bendable to go around gutters, while the bend radius can prevent over-bending. The raceways can follow contours of gutters. Raceway clips can support the raceways and cables as they are routed over the edges of gutters.

Although specific examples and features have been described above, these examples and features are not intended to limit the scope of the present disclosure, even where only a single example is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

The invention claimed is:

1. A method comprising:
mounting a molded rubber raceway to a roof of a building using one or more raceway clips, including, for each raceway clip, securing a lower portion of the raceway clip under at least one shingle of the roof such that a protruding portion of the raceway clip protrudes away from the roof and over the molded rubber raceway;
connecting one or more cables to one or more photovoltaic solar modules installed on the roof; and
routing the cables across the roof by securing the cables to the molded rubber raceway.

2. The method of claim 1, wherein the molded rubber raceway includes a plurality of lower ribs, and wherein mounting the molded rubber raceway includes mounting the molded rubber raceway such that the lower ribs elevate the molded rubber raceway from the roof.

3. The method of claim 1, wherein the molded rubber raceway includes a plurality of upper ribs, and wherein securing the cables to the molded rubber raceway includes securing the cables such that the upper ribs elevate the cables from the molded rubber raceway.

4. The method of claim 1, wherein the molded rubber raceway comprises a pair of sidewalls on opposite sides of the molded rubber raceway, and wherein securing the cables to the molded rubber raceway includes placing the cables between the sidewalls.

5. The method of claim 1, wherein securing the cables to the molded rubber raceway includes elevating the cables from the roof by at least ⅞ of an inch (2.22 cm).

6. The method of claim 1, wherein mounting the molded rubber raceway to the roof comprises bending the molded rubber raceway around an eave of the roof.

7. The method of claim 1, wherein mounting the molded rubber raceway to the roof comprises bending the molded rubber raceway to run both vertically and diagonally across the roof.

8. The method of claim 1, wherein the molded rubber raceway comprises a plurality of separate raceway sections, and wherein mounting the molded rubber raceway to the roof comprises joining the raceway sections end-to-end.

9. A photovoltaic solar system comprising:
one or more photovoltaic solar modules mounted on a roof of a building;
a molded rubber raceway mounted to the roof by one or more raceway clips, wherein, for each raceway clip, a lower portion of the raceway clip is secured under at least one shingle of the roof such that a protruding portion of the raceway clip protrudes away from the roof; and
one or more cables routed across the roof and secured to the molded rubber raceway.

10. The photovoltaic solar system of claim 9, wherein the molded rubber raceway includes a plurality of lower ribs, and wherein the molded rubber raceway is mounted such that the lower ribs elevate the molded rubber raceway from the roof.

11. The photovoltaic solar system of claim 9, wherein the molded rubber raceway includes a plurality of upper ribs, and wherein the cables are secured such that the upper ribs elevate the cables from the molded rubber raceway.

12. The photovoltaic solar system of claim 9, wherein the molded rubber raceway comprises a pair of sidewalls on opposite sides of the molded rubber raceway, and wherein the cables are placed between the sidewalls.

13. The photovoltaic solar system of claim 9, wherein the cables are elevated from the roof by at least ⅞ of an inch (2.22 cm).

14. The photovoltaic solar system of claim 9, wherein the molded rubber raceway is bent around an eave of the roof.

15. The photovoltaic solar system of claim 9, wherein the molded rubber raceway runs both vertically and diagonally across the roof.

16. The photovoltaic solar system of claim 9, wherein the molded rubber raceway comprises a plurality of separate raceway sections, and wherein the raceway sections are joined end-to-end.

* * * * *